United States Patent Office 3,438,748
Patented Apr. 15, 1969

3,438,748
METHOD FOR THE PREPARATION OF THIOGOLD (I) COMPOUNDS
Bernard Hippoliet Tavernier, Edegem, and Alfons Jozef De Meyer, Schelle, Belgium, assignors to Gevaert-Agfa N.V., Mortsel, Belgium, a Belgian company
No Drawing. Filed Dec. 19, 1966, Ser. No. 602,492
Claims priority, application Great Britain, Dec. 29, 1965, 55,043/65
Int. Cl. C07f 1/12; C01b 17/00; C01g 7/00
U.S. Cl. 23—315                              5 Claims

ABSTRACT OF THE DISCLOSURE

High purity thiogold (I) compounds useful in preparing photo-sensitive silver halide emulsion layers are prepared by
(1) Mixing a gold (III) compound with aqueous ammonia to form a "gold fulminate," and
(2) Causing the "gold fulminate" to react with a compound containing a bivalent sulfur atom such as a thiol or salt thereof, a thioacid or its corresponding anhydride, a thioether, a thio-oxo compound, or a thiosulphate. Steps (1) and (2) may be combined by forming the "gold fulminate" in situ, i.e., by reacting the gold (III) compound directly with one of the above sulfur compounds in an aqueous-ammonia medium.

---

The present invention relates to the preparation of thiogold (I) compounds.

According to a known method some thiogold (I) compounds can be prepared by allowing to react a thio compound with a gold (I) salt obtained by reduction of a water-soluble gold (III) compound, such as tetrachloroauric (III) acid or potassium tetrabromoaurate (III) with sulphurous acid or a water-soluble salt thereof or by reduction with the thio compound itself, which is in that case, used in excess (see British patent specifications 265,777 and 386,562, and U.S. patent specifications 1,683,104 and 2,518,154).

A universal preparation method for thiogold (I) compounds, however, does not exist, and it is quite difficult to isolate a very pure thiogold (I) compound due to the presence of oxidized reductor as well as of oxidized thio compounds in the reaction medium (see British patent specification 157,226 and U.S. patent specification 1,994,213).

It has now been found that thiogold (I) compounds can be obtained by allowing to react sulphur compounds containing a bivalent sulphur atom such as thiols, salts thereof, thioacids and corresponding anhydrides, thioethers, thioxo compounds or thiosulphates with the reaction product obtained by mixing a water-soluble gold (III) salt with an aqueous solution of ammonia.

The sulphur compounds, which are preferably used in the preparation according to the present invention, correspond to one of the following general formulae:

R—S—H     (I)

R₁—S—R₂    (II)

   (III)

R₅—SO₃—S—R₆   (IV)

In Formula I R represents a hydrogen atom, a aliphatic radical including a substituted aliphatic radical, e.g. an alkyl radical, or olefinic unsaturated aliphatic radical, e.g. allyl, an alicyclic radical, e.g. a cyclohexyl radical, an aromatic radical including a substituted aromatic radical, e.g. a phenyl radical, or a heterocyclic radical including a substituted heterocyclic radical. Substituents on these radicals are, e.g., a hydroxy group, an alkyl group, a cycloalkyl group, an aralkyl group, a trifluoromethyl group, an aryl group, an alkoxy group, aryloxy group, amino group, alkylamino group, arylamino group, acylamino group, a hydrazine group which basic groups can be quaternized or converted in salt form, a sulphamyl group, a sulphonylalkyl group, a sulphonylaryl group, a sulpho group in acid or salt form, a carboxyl group in acid or salt form, a carboxyalkyl group, a nitrile group, or a halogen atom.

Typical examples of compounds wherein R has one of the meanings as described are, e.g., hydrogen sulphide, mercaptosuccinic acid; cystein, α-mercaptoacetic acid, β-mercaptoglycerol, 2-mercaptobenzimidazole, thioglucose, α-thioacetanilide, sodium thiomalate, sodium 3-thio-2-propanol-1-sulphonate, calcium thioglycolate and sodium 2-thiobenzimidazole-4-carboxylate.

In Formula II each of $R_1$ and $R_2$ represents an organic radical, such as an aliphatic radical including a substituted aliphatic radical, e.g., an alkyl radical or an olefinic unsaturated aliphatic radical, e.g. allyl, an alicyclic radical, e.g. a cyclohexyl radical, an aromatic radical including a substituted aromatic radical, e.g. a phenyl radical, or a heterocyclic radical including a substituted heterocyclic radical. These radicals may be substituted as described for R, or $R_1$ and $R_2$ together represent the necessary atoms for completing a heterocyclic nucleus including a substituted heterocyclic nucleus.

Typical examples of compounds with $R_1$ and $R_2$ groups as described are, e.g., S-methylpropionic acid, ethylthio ethylamine, dibenzyl sulphide, 2-methylthiobenzimidazole and tetrahydrothiophene.

In Formula III each of $R_3$ and $R_4$ represents an aliphatic radical including a substituted aliphatic radical, e.g., an alkyl radical, an olefinic unsaturated aliphatic radical, e.g., allyl, or a hydrocarbon chain interrupted by hetero atoms such as oxygen, nitrogen, and sulphur, an alicyclic radical, e.g. a cyclohexyl radical, an aromatic radical including a substituted aromatic radical, e.g. a phenyl radical, a heterocyclic radical including a substituted heterocyclic radical, or radicals of the group consisting of acylamino, e.g. aroylamino, hydroxyl, mercapto, and derivatives of such radicals, e.g. alkoxy and alkylmercapto, or $R_3$ and $R_4$ together represent the necessary atoms for completing a heterocyclic nucleus including a substituted heterocyclic nucleus.

Typical examples of compounds with $R_3$ and $R_4$ groups as described are, e.g., thiourea, tetramethylthiourea, thiosemicarbazide, thioacetamide, and N,N-dimethyl-thioacetamide.

In Formula IV $R_5$ represents a metal atom, e.g. an alkali metal atom, or an onium group, e.g. an organic ammonium group, and $R_6$ represents a metal atom, an onium group, an amino group including a substituted amino group, or an aliphatic radical including a substituted aliphatic radical, e.g. an alkyl radical, an olefinic unsaturated aliphatic radical, e.g. allyl, an alicyclic radical, e.g. a cyclohexyl radical, an aromatic radical including a substituted aromatic radical, e.g. a phenyl radical including a substituted hererocyclic radical.

Substituents for these radicals can be the same as explained for R.

Typical examples of compounds with $R_5$ and $R_6$ as described have the following structural formulae:

$Na_2S_2O_3$
$NH_2(CH_2)_2S_2O_3Na$
$CH_3NH(CH_2)_2S_2O_3H$ and $(CH_3)_2N(CH_2)_2S_2O_3H$ As gold (III) compounds are particularly mentioned water-soluble tetrahaloaurates (III) or tetrahaloauric (III) acids, more particularly a water-soluble tetrachoroaurate (III).

The reaction product obtained by mixing a gold (III) compound dissolved in water with an aqueous solution of ammonia, containing as is well known a mixture of ammonium hydroxide and ammonia) will be further designed by the name "gold fulminate." The aqueous solution of ammonia contains in respect of the gold (III) compound preferably a molar excess of 10 to 100 of the mixture of ammonium hydroxide and ammonia, more preferably an excess in the range of 50 to 70. The preparation of "gold fulminate" is described i.e. by F. Chemnetius, Chem. Ztg. 51 (1927), p. 823. The "gold fulminate" can be prepared "in situ" (in the reaction medium containing the sulphur compound) by reaction of a water-soluble gold (III) compound in an aqueous solution of ammonia comprising one of the said sulphur compounds.

As an illustration of the preparation of the so-called "gold fulminate" a detailed description follows:

An amount of 10 g. of tetrachloroauric (III) acid tetrahydrate is dissolved in 50 ml. of water. To this solution 100 ml. of a concentrated aqueous ammonia solution (25% by weight) is added. The precipitate formed (gold fulminate) can be freed of the non-reacted ammonia and ammonium hydroxide by washing it with water.

The reaction of "gold fulminate" with the sulphur compounds having the general Formulae I, II and III is preferably carried out in acid medium. Hydrochloric acid is preferably used for acidifying the reaction medium.

As examples of the preparation of thiogold (I) compounds according to the invention by means of sulphur compounds according to the Formulae I, II, II and IV, the following preparations are given (the molar weight of gold fulminate is calculated on the gold present in that product).

Preparation of gold (I)-thiomalic acid

A suspension of 0.048 mole of gold fulminate is washed with water and acidified with hydrochloric acid to pH=2, whereupon 0.1 mole of thiomalic acid is added. The gold (I) salt is precipitated from the solution with acetone in the form of a yellow powder.

Yield:

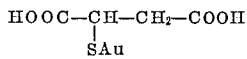

Au calculated: 56.77%. Found: 56.7%.

Preparation of gold (I)-methionine dichloride

A suspension of 0.025 mole of gold fulminate is washed with water and acidified with hydrochloric acid to pH=2, whereupon a solution of 0.05 mole of methionine in hydrochloric acid is added. The mixture is heated on a water bath till complete dissolution. The gold (I) salt crystallizes and is then purified by recrystallization from water that has been acidified with hydrochloric acid. A product according to the following formula is obtained:

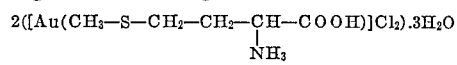

Au calculated: 44.4%. Found: 44.5%.
Cl calculated: 16.0%. Found: 15.9%.

Preparation of dibenzyl sulphide-gold (I) chloride

An alcoholic solution of 0.013 mole of dibenzyl sulphide is added to an aqueous suspension of 0.004 mole of gold fulminate that has been washed previously with water and acidified with hydrochloric acid to a pH=2.5. The solution is extracted with chloroform. The product formed is recrystallized from isopropanol so as to obtain white needles melting at 125° C.

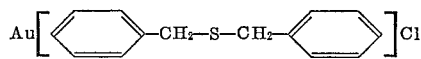

Au calculated: 44.12%. Found: 44.32%.

Preparation of di(thiourea)-gold (I) chloride

An acidified suspension of 0.024 mole of gold fulminate having a pH of 2 is added to an aqueous solution of 0.05 mole of thiourea. The mixture is heated on a water bath till complete dissolution, and filtered subsequently. The di(thiourea)-gold (I) chloride crystallizes out and is then washed with acetone and ether. White needles are obtained.

Yield: 8.6 g. of a product according to the formula:

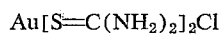

Au calculated: 51.2%. Found: 51.1%.
Cl calculated: 9.21%. Found: 9.15%.

Preparation of di(thiosemicarbazide)-gold (I) chloride

To a suspension of 0.048 mole of gold fulminate which has been washed previously with water and acidified with hydrochloric acid, a solution of 0.147 mole of thiosemicarbazide in hydrochloric acid is added. After filtration and cooling, a white product is obtained, which is then recrystallized from water.

Yield: 16.5 g. of a product according to the formula:

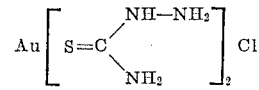

Au calculated: 47.5%. Found: 47.7%.

Preparation of trisodium di(thiosulphate)-aurate (I)

A solution of 0.08 mole of tetrachloroauric (III) acid is added portionwise to a solution of 0.22 mole of sodium thiosulphate in 300 cc. of aqueous concentrated ammonia (25% by weight). After complete discolouration of the solution, precipitation is carried out with ethanol (three times the volume of the solution). White needles are obtained, which are washed with alcohol and ether.

Yield: 97% of a compound according to the formula:

Au calculated: 37.45%. Found: 37.3%.

The preparation method of thiogold (I) compounds according to the present invention is extremely simple as appears from the examples and moreover offers the advantage of giving a very high yield.

Without previous purification the products formed are very pure already.

Thiogold (I) compounds can be applied in the preparation of light-sensitive silver halide emulsion layers and some of them present interesting pharmaceutical characteristics (see Archives of Interamerican Rheumatology, vol. VI, No. 1 (March 1963), A. W. Nincham—gold compounds, their chemistry, pharmacology and pharmacy, pp. 113–140).

We claim:

1. Process for the preparation of a thiogold (I) compound, wherein a compound containing a bivalent sulfur atom is allowed to react with the reaction product obtained from a gold (III) compound and ammonia dissolved in water.

2. Process for the preparation of a thiogold (I) compound according to claim 1, wherein the compound containing a bivalent sulfur atom is selected from the group consisting of a thiol, the salt of a thiol, a thioacid, the anhydride of a thioacid, a thioether, a thio-oxo compound, and a thio-sulfate.

3. Process for the preparation of a thiogold (I) compound according to claim 1, wherein the compound containing a bivalent sulfur atom is selected from the group consisting of:

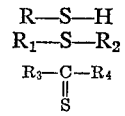

and

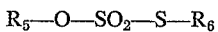

wherein:

R is selected from the group consisting of hydrogen, an aliphatic radical, an alicyclic radical, an aromatic radical, and a heterocyclic radical, each of $R_1$ and $R_2$ is selected from the group consisting of an aliphatic, alicyclic, aromatic or heterocyclic radical, and $R_1$ and $R_2$ together form the residue of a heterocyclic nucleus, each of $R_3$ and $R_4$ is selected from the group consisting of an aliphatic radical, an alicyclic radical, an aromatic radical, and heterocyclic radical, and $R_3$ and $R_4$ together form the residue of a heterocyclic nucleus, $R_5$ is selected from the group consisting of a metal atom and an onium, and $R_6$ is selected from the group consisting of a metal atom, an onium, an amino radical, an aliphatic radical, an alicyclic radical, an aromatic radical, and a heterocyclic radical.

4. A process for the preparation of a thiogold (I) compound according to claim 1, wherein the gold (III) compound is selected from the group consisting of a tetrahaloaurate (III) and a tetrahaloauric (III) acid.

5. Process for the preparation of a thiogold (I) compound according to claim 1, wherein the compound containing a bivalent sulfur atom is selected from the group consisting of:

R—S—H
$R_1$—S—$R_2$ and

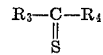

wherein:

R is selected from the group consisting of hydrogen, an aliphatic radical, an alicyclic radical, an aromatic radical and a heterocyclic radical, each of $R_1$ and $R_2$ is selected from the group consisting of an aliphatic radical, an alicyclic radical, an aromatic radical, and a heterocyclic radical, and $R_1$ and $R_2$ together form the residue of a heterocyclic nucleus, and each of $R_3$ and $R_4$ is selected from the group consisting of an aliphatic radical, an alicyclic radical, an aromatic radical, and a heterocyclic radical, and $R_3$ and $R_4$ together form a residue of a heterocyclic nucleus, is mixed in an aqueous acidic medium with the reaction product obtained from a gold (III) compound and ammonia dissolved in water.

References Cited

UNITED STATES PATENTS

| | | | |
|---|---|---|---|
| 1,633,626 | 6/1927 | Feldt et al. | 260—430 |
| 1,683,104 | 9/1928 | Schoeller et al. | 260—430 |
| 3,163,665 | 12/1964 | Fitch | 260—430 |

OSCAR R. VERTIZ, *Primary Examiner.*

HOKE S. MILLER, *Assistant Examiner.*

U.S. Cl. X.R.

260—430